(12) United States Patent
Duarte

(10) Patent No.: US 12,543,726 B2
(45) Date of Patent: Feb. 10, 2026

(54) DECOY APPARATUS AND METHOD OF USE

(71) Applicant: Brandon Ramon Duarte, Craig, CO (US)

(72) Inventor: Brandon Ramon Duarte, Craig, CO (US)

( * ) Notice: Subject to any disclaimer, the term of this patent is extended or adjusted under 35 U.S.C. 154(b) by 0 days.

(21) Appl. No.: 18/131,846

(22) Filed: Apr. 6, 2023

(65) Prior Publication Data

US 2023/0320344 A1 Oct. 12, 2023

Related U.S. Application Data

(60) Provisional application No. 63/328,060, filed on Apr. 6, 2022.

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
See application file for complete search history.

(56) References Cited

U.S. PATENT DOCUMENTS

| | | | | |
|---|---|---|---|---|
| 2,947,104 A * | 8/1960 | Johnson | ................ | A01M 31/06 D22/125 |
| 3,245,168 A * | 4/1966 | Pool | ...................... | A01M 31/06 D22/125 |
| 3,350,808 A * | 11/1967 | Mitchell | ................ | A01M 31/06 D22/125 |
| 4,251,937 A * | 2/1981 | Curley | ................... | A01M 31/06 43/3 |
| 4,651,457 A * | 3/1987 | Nelson | ................... | A01M 31/06 43/3 |
| 4,852,288 A | 8/1989 | Payne et al. | | |
| 4,928,418 A * | 5/1990 | Stelly | ..................... | A01M 31/06 43/3 |
| 5,142,833 A * | 9/1992 | Svehaug | ................... | F41H 3/00 43/1 |
| 5,172,506 A * | 12/1992 | Tiley | ...................... | A01M 31/06 43/3 |
| 5,241,772 A * | 9/1993 | Hall | ....................... | A01M 31/00 49/404 |

(Continued)

FOREIGN PATENT DOCUMENTS

| | | |
|---|---|---|
| CA | 2177498 A1 * 5/1996 | |
| RU | 2263754 C2 * 11/2005 | ............... E05D 7/04 |

*Primary Examiner* — Magdalena Topolski
(74) *Attorney, Agent, or Firm* — HSML P.C.

(57) ABSTRACT

A decoy apparatus includes a first panel having a first surface that simulates a front view of an animal. A second panel has a second surface that simulates a side view of the animal. The first and second panels are rotatably connected to one another so that the second panel is rotatable to between a first position and a second position. When the second panel is in the first position, the first and second surfaces face the same direction and the decoy apparatus appears to an observer to be an animal with its head turned. When the second panel is in the second position, the second surface is perpendicular to the first surface and obscured from view by the first panel and thus the decoy apparatus appears to be the front of the animal.

17 Claims, 5 Drawing Sheets

(56) References Cited

U.S. PATENT DOCUMENTS

| | | | | |
|---|---|---|---|---|
| 5,522,168 | A | * | 6/1996 | Friddle ................ A01M 31/06 135/901 |
| 5,632,110 | A | * | 5/1997 | Roy .................... A01M 31/06 43/2 |
| 6,634,132 | B2 | * | 10/2003 | Lorenz ................ A01M 31/06 43/2 |
| 6,769,950 | B1 | * | 8/2004 | Suciu .................... A63H 33/40 40/422 |
| 6,925,745 | B1 | * | 8/2005 | Alessi ................ A01M 31/025 135/901 |
| 7,090,557 | B1 | * | 8/2006 | Ainsworth, Jr. ........ G09F 19/08 446/268 |
| 8,997,394 | B2 | * | 4/2015 | Baskfield .............. A01M 31/06 43/3 |
| 11,224,215 | B2 | | 1/2022 | Davis et al. |
| 2018/0213770 | A1 | * | 8/2018 | Davis .................... A01M 31/06 |
| 2019/0069536 | A1 | | 3/2019 | Davis et al. |

* cited by examiner

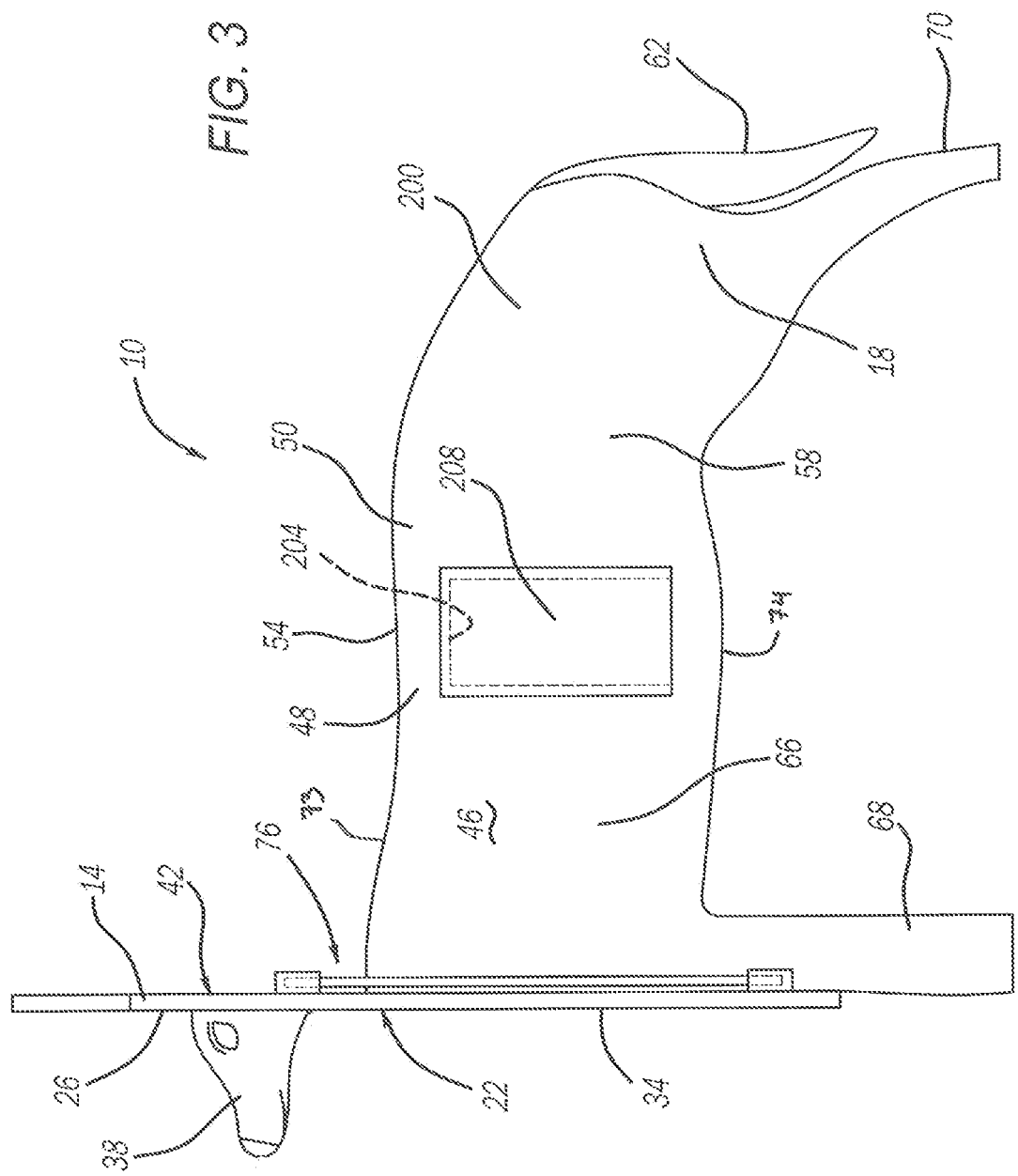

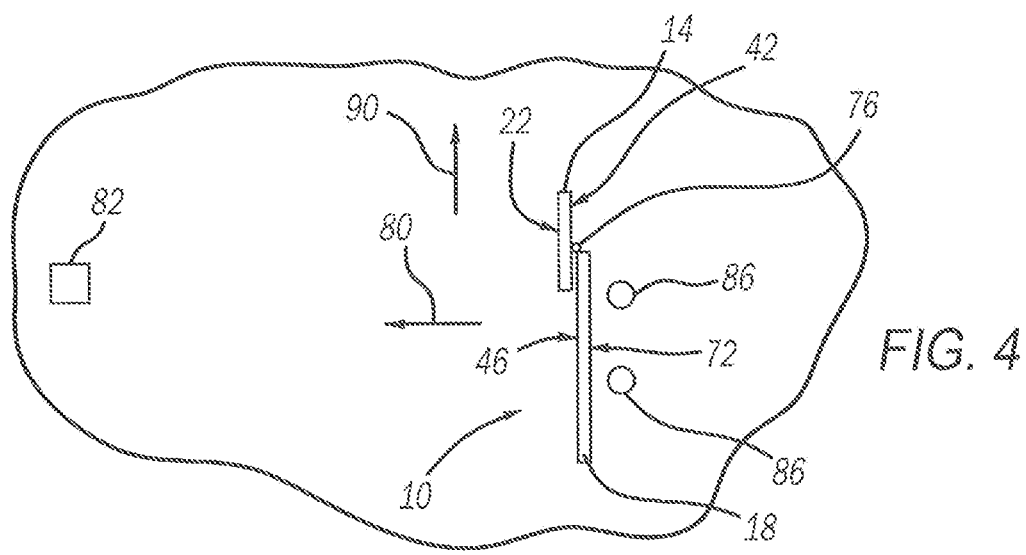
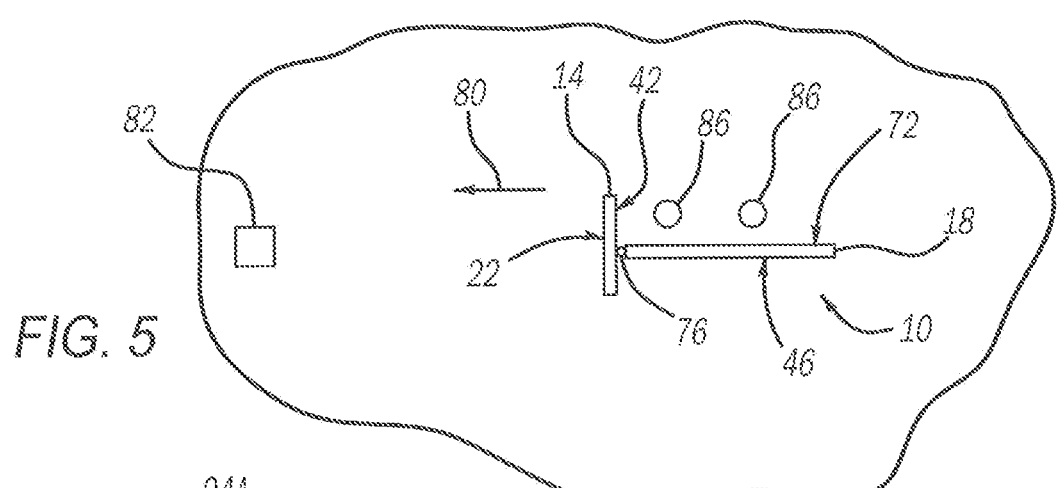
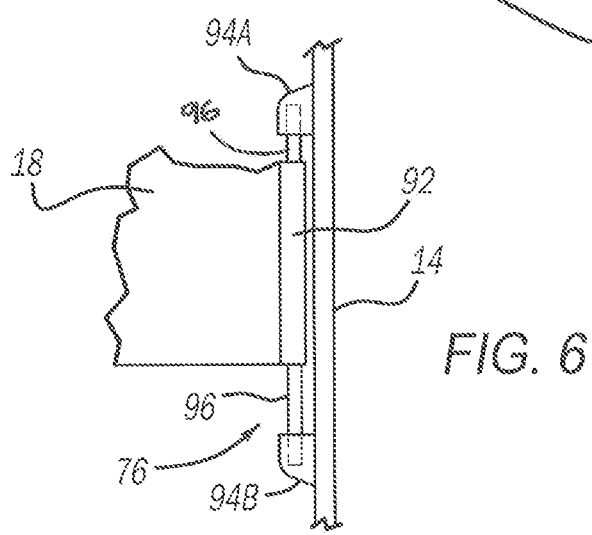

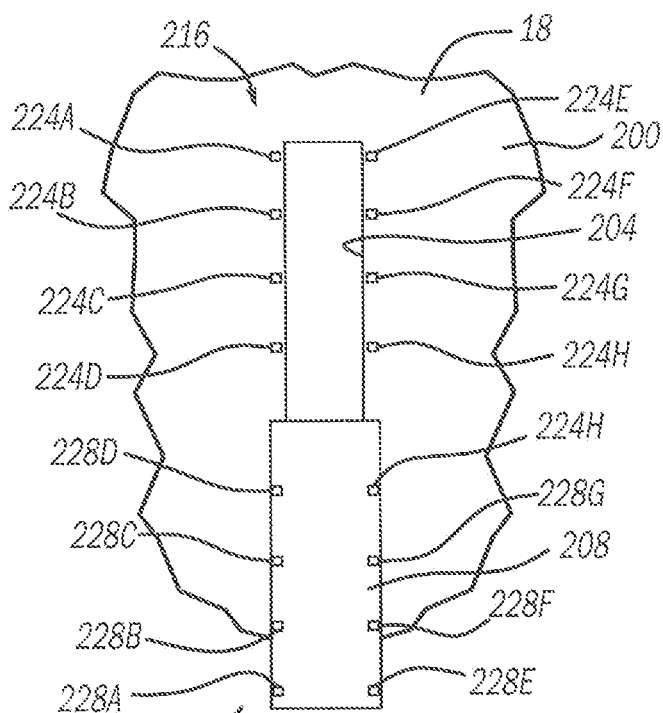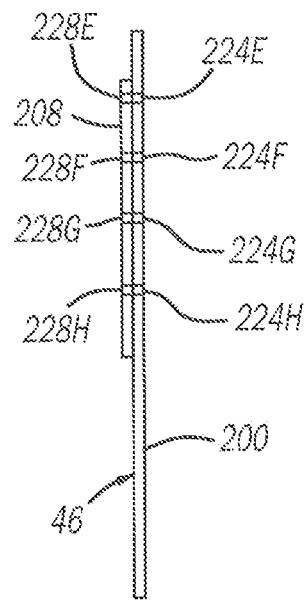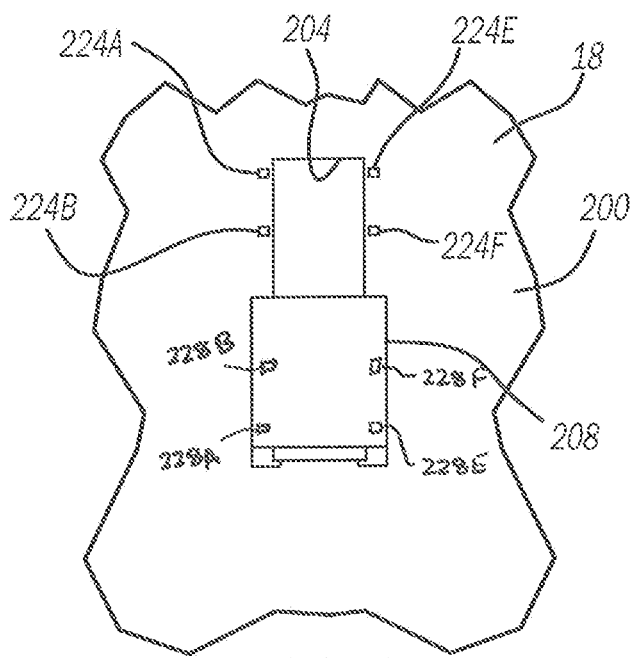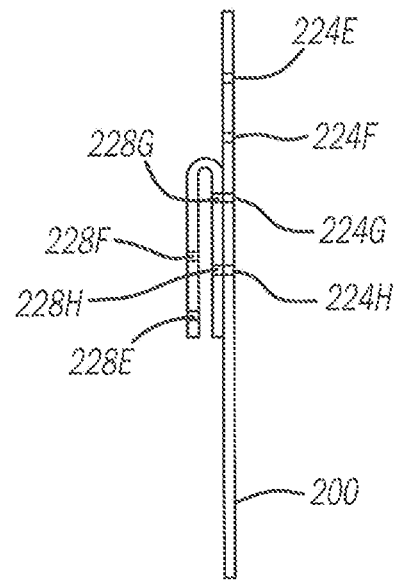

DECOY APPARATUS AND METHOD OF USE

CROSS-REFERENCE TO RELATED APPLICATION

This application claims the benefit of U.S. Provisional Patent Application No. 63/328,060, filed on Apr. 6, 2022, and which is hereby incorporated by reference in its entirety.

TECHNICAL FIELD

This disclosure relates to decoys for large game animals.

BACKGROUND

Hunters may use decoys to lure game animals. Decoys include three-dimensional replicas of various animals. However, decoys for large game animals such as elk, deer, and moose, are often large and must be transported into the game animal's habitat. Accordingly, prior art decoys also include flat panels having the shape of an animal and/or graphics of an animal printed thereon. Decoys having a flat panel are sometimes referred to as "two dimensional" decoys and are significantly lighter and occupy significantly less volume than three-dimensional decoys, and are therefore much easier to carry into game habitat.

SUMMARY

A decoy apparatus is provided herein. The decoy apparatus includes a first panel having a first surface depicting or simulating the head, neck, and shoulders of an animal. The decoy apparatus also includes a second panel having a second surface depicting or simulating the torso of the animal.

The second panel is connected to the first panel such that the second panel is selectively rotatable relative to the first panel between a first position and a second position. When the second panel is in the first position, the first and second surfaces are substantially parallel to one another and face the same direction. When the second panel is in the second position, the second surface is substantially perpendicular to the first surface.

The decoy apparatus provided herein improves upon the prior art by enabling realistic movement of a "two-dimensional" style decoy, thereby increasing its effectiveness. More specifically, when the second panel is in the first position relative to the first panel, the first and second surfaces face the same direction and therefore the decoy apparatus appears to an observer as a substantially whole, entire animal as viewed from the side (with the head of the animal appearing turned). When the second panel is in the second position, the second panel is not visible to the observer, and the decoy apparatus appears to the observer as a substantially whole, entire animal as viewed from the front.

The movement of the second panel to the second position enables hunters stalking an animal to appear natural, thereby increasing the hunters' chances of success. More specifically, a method of using the decoy apparatus may include placing the decoy apparatus with the second panel in the first position between one or more hunters and a game animal with the first and second surfaces facing the game animal. In this position, the decoy apparatus presents the appearance of a substantially whole, entire animal as viewed from the side while simultaneously obstructing the view to the hunter.

If the hunter wants to approach the game animal, the method may include rotating the second panel to the second position so that the second surface is not visible to the game animal and thus the decoy apparatus appears to be the front of the animal and forward movement of the decoy apparatus will appear natural to the game animal. Accordingly, the decoy apparatus will permit the hunter to move toward the game animal while still being hidden from view behind the first panel.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic, side view of the decoy apparatus with the body portion in the second position relative to the head portion;

FIG. 4 is a schematic, top view of the decoy apparatus with the body portion in the first position while the decoy apparatus is in a use scenario;

FIG. 5 is a schematic, top view of the decoy apparatus with the body portion in the second position in the use scenario;

FIG. 6 is a schematic, side view of a hinge interconnecting the body portion and the head portion;

FIG. 7 is a schematic, front view of part of the body portion that defines an aperture and a flap, the flap being in a fully-opened position;

FIG. 8 is a schematic, side view of the body portion with the flap in a fully closed position;

FIG. 9 is a schematic, front view of part of the body portion with the flap in an intermediate position between the fully-opened position and the fully-closed position; and FIG. 10 is a schematic, side view of the body portion with the flap in the intermediate position.

DETAILED DESCRIPTION

Figure 1:
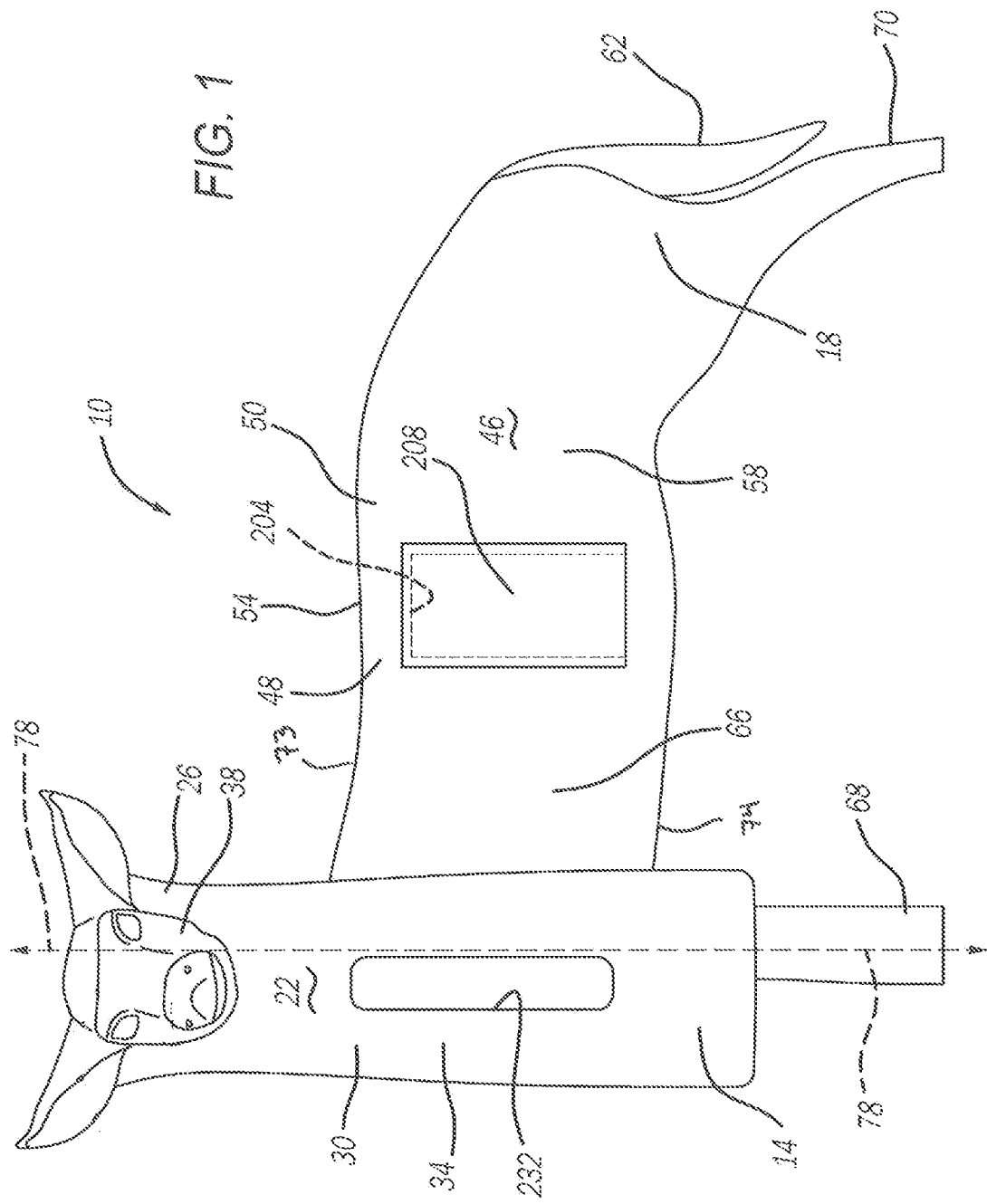
FIG. 1 is a schematic, front view of a decoy apparatus having a body portion and a head portion with a face member attached thereto, the body portion being in a first position relative to the head portion.

Referring to the Figures, wherein like reference numbers refer to like components throughout, a decoy apparatus 10 is schematically depicted. The decoy apparatus 10 includes a head portion 14 and a body portion 18, which may also be referred to herein as a "first panel" and a "second panel," respectively. The decoy apparatus 10 is a silhouette, or "2D," type of decoy, and thus the head portion 14 and the body portion 18 are comprised of relatively thin panels or sheets having substantially flat, planar surfaces on which the images of an animal are printed or otherwise placed.

More specifically, in the embodiment depicted, the head portion 14 defines a surface 22 that is substantially planar and that has the size and shape (i.e, silhouette) of an animal's head 26, neck 30, and shoulders 34. In the embodiment depicted, the animal that the decoy imitates is an elk, though other animals may be employed within the scope of the claimed invention. The surface 22 also includes an image that simulates, and may be a realistic depiction of, the head, shoulders, and neck of the animal (the front view of the animal) printed thereon or otherwise attached thereto.

In the embodiment depicted, the head portion 14 also includes a face member 38 that is attached to the surface 22 such that the face member 38 protrudes from the surface 22 for a realistic appearance, though it should be noted that the face may also be a two-dimensional depiction within the scope of the claimed invention. The head portion 14 also defines a surface 42 that is substantially parallel to surface 22 and that faces the opposite direction from surface 22.

The body portion 18 defines a surface 46 that is substantially planar and that has the size and general shape (i.e, silhouette) of an animal's body 50 rearward of the head, neck and shoulders. Surface 46 also includes a realistic image 48 printed or otherwise attached thereto of the body 50, or torso, of the animal, including the back 54, abdomen 58, tail 62, thorax 66, and the top portions of front leg 68 and rear leg 70. Surface 72 is on the opposite side of the body portion 18 from surface 46; surfaces 46 and 72 face opposite directions. The body portion 18 simulates a torso 50 between an upper edge 73 and a lower edge 74.

Figure 2:
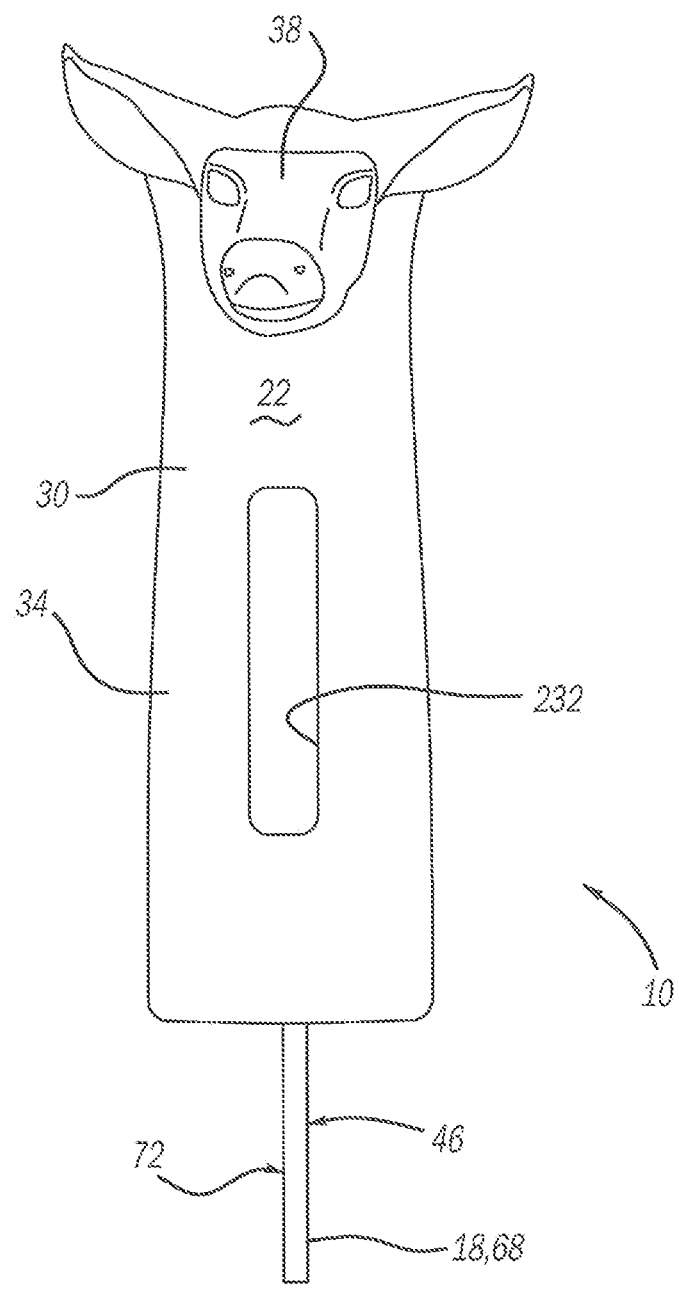
FIG. 2 is a schematic, front view of the decoy apparatus with the body portion in a second position relative to the head portion.

The head portion 14 and the body portion 18 are rotatably interconnected to each other via a hinge assembly 76 such that the body portion 18 is rotatable about an axis 78 between a first position, as shown in FIGS. 1 and 4, and a second position, as shown in FIGS. 2-3 and 5. When the decoy assembly 10 is in its typical use position, i.e., with the image of the animal appearing upright, the axis 78 is substantially vertical.

When the body portion 18 is in the first position, as shown in FIGS. 1 and 5, surfaces 46 and 22 are substantially parallel to one another and face the same direction 80. Accordingly, when the body portion 18 is in the first position, the decoy apparatus 10 appears to an observer 82 as an entire animal, with the image and depiction of the head 26, neck 30, shoulders 34, thorax 66, abdomen 58, tail 62, etc. all being visible from the vantage point of the observer 82.

When the body portion 18 is in the second position, as shown in FIGS. 2-3 and 5, the body portion 18 is substantially perpendicular to the head portion 14 and is behind the head portion 14. Thus, to the observer 82 located in the forward direction 80 of the apparatus 10, surface 22 of the head portion 14 is visible, but the body portion 18 is significantly obstructed by the head portion 14, and surface 46 is not visible, as best shown in FIG. 2. Accordingly, when the body portion 18 is in the second position, the decoy apparatus 10 appears to be the front of an animal as if the animal is moving in direction 80, i.e., toward the observer 82.

A method of using the decoy apparatus 10 is schematically depicted in FIGS. 4 and 5. Referring specifically to FIG. 4, the decoy apparatus 10 is shown with the body portion 18 in the first position relative to the head portion 14. Accordingly, the surfaces 22, 46 both face the same direction 80. If the observer 82 is a game animal, then the game animal will see the entire decoy 10, as it is depicted in FIG. 1. Thus, with the body portion 18 in the first position, the decoy apparatus 10 appears to the game animal 82 as an entire animal, which improves the realism of the decoy apparatus 10 and may render the decoy apparatus 10 more effective in attracting the game animal 82.

In the method depicted, one or more hunters 86 are employing the decoy apparatus 10 for stalking the game animal 82. Accordingly, the hunters 86 are behind the decoy apparatus 10, i.e., the decoy apparatus 10 is between the hunters 86 and the game animal 82 so that the decoy apparatus 10 at least partially obstructs the game animal's view of the hunters 86. The method may include the hunters 86 moving with the decoy apparatus 10, for example to get a better view or shot of the game animal 82. The method may include moving in direction 90, which is perpendicular to the direction 80, and which would appear to the game animal 82 as if the decoy apparatus 10 is walking forward naturally.

However, if the hunters 86 wanted to approach the game animal 82, i.e. move the decoy apparatus 10 in direction 80, the decoy apparatus 10 would appear to the game animal 82 to be walking sideways, which would be an unnatural movement and spook or scare the game animal 82.

Accordingly, the method may also include moving the body portion 18 to the second position as shown in FIG. 5 and then moving the decoy apparatus 10 in direction 80 (towards the game animal 82) with the surface 22 facing the game animal 82. Referring to FIG. 5, with the body portion 18 in the second position relative to the head portion 14, the decoy apparatus 10 will appear, from the position of the game animal 82, to be the front of an animal, and therefore forward movement (i.e., in direction 80) of the decoy apparatus 10 will appear natural. That is, the game animal 82 will see surface 22, but not surface 46.

Accordingly, the decoy apparatus 10 provides the realism and appearance of a full-body decoy, while also enabling a natural appearance when moving the decoy apparatus 10 in the direction of a game animal. It should be noted that, in the embodiment depicted, the body portion 18 is rotatable one hundred and eighty degrees about axis 78; thus, in the embodiment depicted, the body portion 18 is further rotatable about axis 78 to a third position (not shown in the drawings) relative to the head portion 14. In the third position, the surface 72 of the body portion 18 is substantially parallel to, and faces the same direction as, surface 22. Furthermore, the description herein of movement of the body portion 18 from the first position to the second position during use of the decoy apparatus 10 is merely exemplary; a user may, within the scope of the claimed invention, rotate the body portion 18 to any position(s) relative to the head portion 14 that are advantageous to the user under the circumstances.

In the embodiment depicted, the head portion, or first panel, 14 extends above the upper edge 73 and below the lower edge 74, as best shown in FIG. 1, so that the first panel 14 is able to obstruct the hunters 86 from the view of the game animal 82 when the second panel 18 is in the second position as shown in FIG. 5.

FIG. 6 schematically depicts the hinge assembly 76, though it should be noted that other hinge assembly configurations may be employed within the scope of the claimed invention. Any hinge may be employed within the scope of the claimed invention. Referring to FIG. 6, the hinge assembly 76 includes a loop 92 mounted to the body portion 18 at or adjacent to the body portion's forward edge. The loop 92 defines an elongated passageway that is vertically oriented when the decoy assembly 10 is in its use position, i.e., when the image and likeness of the animal thereon is upright.

The hinge assembly 76 further includes upper and lower pockets 94A, 94B mounted to surface 42 of the head portion 14, and a cylindrical rod 96. The cylindrical rod 96 extends through the passageway of the loop 92; one end of the rod 96 extends into the upper pocket 94A and the other end of the rod 96 extends into the lower pocket 94B.

The first and second panels 14, 18 may have any suitable construction within the scope of the claimed invention. For example, the panels 14, 18 may be rigid polymeric sheets.

However, in the embodiment depicted, the panels 14, 18 are flexible fabric sheets that are attached to, light-weight frame members that maintain the fabric sheets in the substantially planar shapes as shown.

Referring to FIG. 7, the body portion 18 in the embodiment depicted includes fabric 200 that defines surface 46. The fabric 200 defines an elongated aperture 204. A fabric flap 208 is mounted to the fabric 200 adjacent the lower edge of the aperture 204. The flap 208 is selectively movable between a fully-closed position and a fully-opened position. In the fully-closed position, as shown in FIGS. 1, 3, and 10, the flap 208 fully covers and obstructs the aperture 204. In the fully-opened position, as shown in FIG. 7, the flap 208 does not significantly cover or obstruct any portion of the aperture 204.

The decoy apparatus 10 includes a fastening system that is configured to releasably retain the flap 208 in the fully-closed position and in at least one intermediate position in which the flap 208 covers a portion of the aperture 204 and leaves another portion of the aperture 204 uncovered. In the embodiment depicted, the fastening system includes a first plurality of magnets 216 and a second plurality of magnets 220. The first plurality of magnets 216 is mounted to the fabric 200, and the second plurality of magnets 220 is mounted to the flap 208.

In the embodiment depicted, the first plurality of magnets 216 includes eight magnets 224A-H. Magnets 224A-D are mounted to the fabric 200 on one side of the aperture 204 and are substantially evenly-spaced on a line that extends parallel to the aperture 204. Similarly, magnets 224E-H are mount to the fabric 200 on the other side of the aperture 204 and are substantially evenly-spaced on another line that extends parallel to the aperture 204.

The second plurality of magnets 220 also includes eight magnets 228A-H. Magnets 228A-H are mounted to the flap 208 such that the magnets 228A-H have the same spatial relationship relative to one another as the magnets 224A-H. Accordingly, when the flap 208 is in the fully-closed position, each of the magnets 228A-H on the flap 204 is in close proximity to a respective one of the magnets 224A-H on the fabric 200 such that the magnetic attraction between each of the magnets 224A-H with a corresponding one of magnets 228A-H is sufficient to maintain the flap 208 in the fully-closed position, as shown in FIGS. 1, 3, and 10.

The flap 208 is movable to the intermediate positions by disengaging successive magnets on the flap 208 from magnets on the fabric 200, beginning with the uppermost magnets. One of the intermediate positions is shown in FIGS. 9 and 10. Referring specifically to FIGS. 9 and 10, the uppermost four magnets 224A, 224B, 224E, 224F are disengaged from magnets on the flap 208, thereby uncovering an upper portion of the aperture 204.

The aperture 204 may be used by hunters to aim a weapon or camera therethrough while the hunters remain concealed behind the decoy apparatus 10. The head portion 14 may also define an aperture 232 with a similar function. It should be noted that the magnets 224A-H, 228A-H may be referred to as "magnetic elements," and that one set of the magnets, 224A-H or 228A-H, may be replaced with ferrous members within the scope of the claimed invention.

While the best modes for carrying out the disclosure have been described in detail, those familiar with the art to which this disclosure relates will recognize various alternative designs and embodiments for practicing the disclosure within the scope of the appended claims.

The invention claimed is:

1. A decoy apparatus mimicking an animal, said animal having a head, a neck, shoulders, and a torso, the decoy apparatus comprising:
  a first panel simulating a shape of the head, the neck, and the shoulders of the animal and defining a first surface having a first image thereon, said first image being a likeness of the head, the neck, and the shoulders of the animal;
  a second panel simulating a shape of the torso of the animal and defining a second surface having a second image thereon, said second image being a likeness of the torso of the animal; and
  a hinge interconnecting the first panel and second panel such that the second panel is rotatable relative to the first panel between a first position and a second position,
  wherein when the second panel is in the first position, the second surface and the first surface are parallel to one another and each face a same direction such that the decoy apparatus presents a side view of the animal in a viewing direction, and
  wherein when the second panel is in the second position, the second surface is perpendicular to the first surface such that the decoy apparatus presents a front view of the animal in the viewing direction.

2. The decoy apparatus of claim 1, wherein the hinge includes:
  a loop mounted to one of the first panel and the second panel, and first and second pockets mounted to the other of the first panel and the second panel; and
  a rod extending through the loop and extending into the first and second pockets.

3. The decoy apparatus of claim 1, further comprising:
  a face member mounted to the first panel such that the face member protrudes from the first surface.

4. The decoy apparatus of claim 1, wherein the second panel defines an elongated aperture that extends through the second surface.

5. The decoy apparatus of claim 4, further comprising:
  a flap mounted to the second panel and being selectively movable between a fully-closed position, a fully-opened position, and a plurality of intermediate positions,
  wherein said flap fully obstructs the elongated aperture in the fully-closed position,
  wherein said flap does not substantially obstruct the elongated aperture in the fully-opened position, and
  wherein the flap obstructs a portion of the aperture that is less than an entirety of the aperture in the intermediate positions.

6. The decoy apparatus of claim 5, further comprising:
  a plurality of magnets attached to the second panel and the flap the plurality of magnets being arranged to retain the flap in the fully-closed position and each of the intermediate positions.

7. The decoy apparatus of claim 1, wherein the viewing direction is configured to be a view of the decoy apparatus from an observer's position.

8. The decoy apparatus of claim 1, wherein in the first position, the same direction being faced by each of the first surface and the second surface is a direction opposite to the viewing direction.

9. The decoy apparatus of claim 1, wherein
  when moved into the first position, the second panel is configured to independently remain in the first position, and when moved into the second position, the second panel is configured to independently remain in the second position.

10. The decoy apparatus of claim 1, wherein
when the second panel is in the first position, the side view of the animal presented by the decoy apparatus in the viewing direction is of a substantially whole entirety of the animal as viewed from a side of the animal, and
when the second panel is in the second position, the front view of the animal presented by the decoy apparatus in the viewing direction by the decoy apparatus is of a substantially whole entirety of the animal as viewed from a front of the animal.

11. The decoy apparatus of claim 1, wherein the second panel includes a lower portion, said second image has a likeness of a leg of the animal on the lower portion, and the hinge being disposed above the lower portion the second panel in a vertical direction.

12. A decoy apparatus comprising:
a first panel having a first surface that simulates a front view of an animal;
a second panel having a second surface that simulates a side view of a torso of the animal; and
a hinge interconnecting the first panel and the second panel such that the second panel is rotatable about an axis with respect to the first panel between a first position and a second position,
wherein when the second panel is in the first position, the first surface and the second surface each face a same direction such that the decoy apparatus presents the side view of the animal in a viewing direction, and
wherein when the second panel is in the second position, the second surface is perpendicular to the first surface such that the decoy apparatus presents the front view of the animal in the viewing direction.

13. The decoy apparatus of claim 12, wherein the first panel and the second panel are formed by fabric.

14. The decoy apparatus of claim 12, wherein the second panel has an upper edge and a lower edge,
wherein the second panel simulates a side view of the torso of the animal between the upper edge and the lower edge, and
wherein the first panel extends above the upper edge and below the lower edge when the decoy apparatus is upright.

15. The decoy apparatus of claim 14, wherein the axis is vertical when the decoy apparatus is upright.

16. The decoy apparatus of claim 12, further comprising:
a face member that is mounted to the first panel and simulating the face of the animal, the face member extends from the first panel such that the face member is visible in the viewing direction both when the second panel is in the first position and when the second panel is in the second position.

17. A method of hunting or stalking prey, the method comprising:
deploying a decoy apparatus in a prey's habitat, the decoy apparatus having a first panel having a first surface that simulates a front view of an animal, a second panel having a second surface that simulates a side view of the torso of the animal, and a hinge interconnecting the first panel and the second panel such that the second panel is rotatable about an axis with respect to the first panel, wherein the deploying of the decoy apparatus includes:
positioning the decoy apparatus in the prey's habitat with the first and second panels positioned such that the first and second surfaces generally face the prey, such that the decoy apparatus presents a side view of the animal to the prey,
subsequent to the positioning of the decoy apparatus in the prey's habitat, rotating the second panel so that the second surface is perpendicular to the first surface, such that the decoy apparatus presents a front view of the animal to prey, and
subsequent to the rotating of the second panel, moving the decoy apparatus toward the prey with the first surface facing the game animal.

* * * * *